(12) United States Patent
Manz

(10) Patent No.: US 10,017,416 B2
(45) Date of Patent: Jul. 10, 2018

(54) COMPOSITE PANE HAVING A SUN PROTECTION AND A HEAT PROTECTION FUNCTION

(71) Applicant: SAINT-GOBAIN GLASS FRANCE, Courbevoie (FR)

(72) Inventor: Florian Manz, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/370,385

(22) PCT Filed: Jan. 21, 2013

(86) PCT No.: PCT/EP2013/050999
§ 371 (c)(1),
(2) Date: Jul. 2, 2014

(87) PCT Pub. No.: WO2013/127563
PCT Pub. Date: Sep. 6, 2013

(65) Prior Publication Data
US 2014/0377580 A1     Dec. 25, 2014

(30) Foreign Application Priority Data
Feb. 27, 2012   (EP) .................................... 12157067

(51) Int. Cl.
*B32B 15/04*    (2006.01)
*B32B 17/06*    (2006.01)
(Continued)

(52) U.S. Cl.
CPC ............ *C03C 17/366* (2013.01); *B32B 15/08* (2013.01); *B32B 17/10036* (2013.01);
(Continued)

(58) Field of Classification Search
USPC ....... 428/426, 428, 432, 434, 688, 689, 701, 428/702
See application file for complete search history.

(56) References Cited

U.S. PATENT DOCUMENTS 3,794,809 A * 2/1974 Beck ...................... B32B 17/10
219/203
3,846,152 A    11/1974 Franz
(Continued)

FOREIGN PATENT DOCUMENTS

DE         2344616       * 3/1975
DE        19927683         1/2001
(Continued)

OTHER PUBLICATIONS

DE2344616 translation.*
(Continued)

*Primary Examiner* — Lauren R Colgan
(74) *Attorney, Agent, or Firm* — Steinfl + Bruno LLP

(57) ABSTRACT

A composite pane having a sun protection and a heat protection function is described. The composite pane has an outer pane having an outer surface and an inner surface, an inner pane having an outer surface and an inner surface, and a thermoplastic intermediate layer, having at least a sun protection coating on at least the inner surface, the outer surface, or in the thermoplastic intermediate layer, and a heat protection layer on the inner surface. The sun protection layer has at least one functional layer containing at least silver, and the heat protection layer has at least one functional layer containing at least one metal of the group consisting of niobium, tantalum, molybdenum, and zirconium.

29 Claims, 5 Drawing Sheets

(51) Int. Cl.
*C03C 17/36* (2006.01)
*B32B 17/10* (2006.01)
*B32B 15/08* (2006.01)
*B32B 37/12* (2006.01)
*B32B 37/18* (2006.01)

(52) U.S. Cl.
CPC .. *B32B 17/10174* (2013.01); *B32B 17/10761* (2013.01); *B32B 37/1207* (2013.01); *B32B 37/18* (2013.01); *C03C 17/36* (2013.01); *C03C 17/3626* (2013.01); *C03C 17/3639* (2013.01); *C03C 17/3644* (2013.01); *C03C 17/3649* (2013.01); *C03C 17/3652* (2013.01); *B32B 2307/712* (2013.01); *B32B 2398/20* (2013.01); *B32B 2419/00* (2013.01); *B32B 2605/006* (2013.01); *Y10T 428/12549* (2015.01); *Y10T 428/24975* (2015.01); *Y10T 428/265* (2015.01); *Y10T 428/31678* (2015.04)

(56) References Cited

U.S. PATENT DOCUMENTS

| | | | |
|---|---|---|---|
| 4,799,745 | A | 1/1989 | Meyer et al. |
| 4,855,186 | A | 8/1989 | Grolig et al. |
| 4,973,511 | A | 11/1990 | Farmer et al. |
| 5,153,062 | A | 10/1992 | Grolig et al. |
| 5,308,706 | A | 5/1994 | Kawaguchi et al. |
| 5,980,666 | A * | 11/1999 | Roth ............... B29C 47/0021 156/107 |
| 6,042,924 | A | 3/2000 | Paulus et al. |
| 7,189,447 | B2 | 3/2007 | Conway et al. |
| 7,582,356 | B2 | 9/2009 | Brochot et al. |
| 8,025,957 | B2 | 9/2011 | Thiel |
| 8,286,395 | B2 * | 10/2012 | Mauvernay ......... C03C 17/3435 428/432 |
| 8,932,701 | B2 | 1/2015 | Kranz et al. |
| 2004/0028953 | A1 * | 2/2004 | Kraemling .............. B32B 17/10 428/698 |
| 2006/0050425 | A1 | 3/2006 | Muromachi et al. |
| 2008/0070045 | A1 | 3/2008 | Barton et al. |
| 2009/0011205 | A1 * | 1/2009 | Thiel ................ B32B 17/10036 428/215 |
| 2009/0098354 | A1 * | 4/2009 | Torr ................. B32B 17/10036 428/215 |

FOREIGN PATENT DOCUMENTS

| | | |
|---|---|---|
| DE | 69731268 | 9/2006 |
| EP | 1060876 | 12/2000 |
| EP | 1744995 | 1/2007 |
| EP | 1993829 | 11/2008 |
| EP | 2268588 | 1/2011 |
| EP | 2489507 | 8/2012 |
| JP | 2001146440 A | 5/2001 |
| JP | 2004026547 A | 1/2004 |
| WO | 03/057479 A2 | 7/2003 |
| WO | 2005110939 | 11/2005 |
| WO | 2006/043026 A1 | 4/2006 |
| WO | 2007101963 | 9/2007 |
| WO | 2009122090 | 10/2009 |
| WO | 2009150343 | 12/2009 |

OTHER PUBLICATIONS

PCT Written Opinion dated Mar. 18, 2013 for PCT/EP2013/050999 filed on Jan. 21, 2013 in the name of Saint-Gobain Glass France (German with English translation).

PCT International Search Report dated Mar. 18, 2013 for PCT/EP2013/050999 filed on Jan. 21, 2013 in the name of Saes Saint-Gobain Glass France.

* cited by examiner

COMPOSITE PANE HAVING A SUN PROTECTION AND A HEAT PROTECTION FUNCTION

CROSS REFERENCE TO RELATED APPLICATIONS

The present application is the US national stage of International Patent Application PCT/EP2013/050999 filed on Jan. 21, 2013 which, in turn, claims priority to European Patent Application EP 12157067.5 filed on Feb. 27, 2012.

The invention relates to a composite pane having a sun protection and a heat protection function, a method for its production, and its use.

The interior of a motor vehicle can heat up greatly in the summer with high ambient temperatures and intense direct sunlight. In order to obtain acceptable thermal comfort for the occupants, the interior can be air-conditioned, which, however, results in increased fuel consumption and the associated increased emission of greenhouse gases, in particular $CO_2$.

Panes with a sun protection function are also known. These panes are provided with a coating, which reflect parts of the sunlight, in particular IR radiation and thus reduce the heating of the vehicle interior. Such coatings are known, for example, from EP 2 268 588 A2, EP 1 993 829 A2, and EP 1 744 995 A2. The pane still heats up with high ambient temperatures and radiates heat into the interior of the motor vehicle.

If the outside temperature is lower than the temperature in the vehicle interior, which occurs in particular in the winter, a cold pane acts as a heat sink which is perceived as unpleasant by the occupants.

A composite pane that is provided with a sun protection coating and with a thermal radiation reflective coating (low E coating, heat protection coating) is known from DE 199 27 683 C1. The low E coating is a tin oxide layer doped with fluorine. If the transmission of visible light through the composite pane is to be reduced, which is, for example, frequently desired with side were rear window panes and, in particular, with roof panels, the proposal is made to tint or to stain a pane or film of the composite pane. This is associated with increased cost in the production of the pane. In addition, dark glass contains a large fraction of typically iron oxide, which can result in corrosion of the functional coatings.

The object of the present invention consists in making available an improved composite pane with a sun protection and a heat protection function as well as a method for production thereof.

The object of the present invention is accomplished according to the invention by a composite pane with a sun protection and a heat protection function according to claim 1. Preferred embodiments emerge from the subclaims.

The composite pane according to the invention with a sun protection and a heat protection function comprising an outer pane with an outer surface and an inner surface, an inner pane with an outer surface and an inner surface, and a thermoplastic intermediate layer comprises at least the following characteristics:

a sun protection coating at least on the inner surface of the outer pane, on the outer surface of the inner pane, or in the thermoplastic intermediate layer, and
  a heat protection coating on the inner surface of the inner pane,
wherein the sun protection coating comprises at least one functional layer, which contains at least silver enthält, and wherein the heat protection coating comprises at least one functional layer, which contains at least one metal from the group consisting of niobium, tantalum, molybdenum, and zirconium.

The composite pane according to the invention is provided, in an opening, for example, of a motor vehicle or of a building, for the purpose of separating the interior from the external environment. In the context of the invention, "outer pane" designates the pane of the composite pane that is provided, in the installation position, to be turned toward the external environment. In the context of the invention, "inner pane" designates the pane of the composite pane that is provided, in the installation position, to be turned toward the interior. In the context of the invention, "outer surfaces" designates those surfaces of the outer pane and of the inner pane that are provided to be turned toward the external environment. In the context of the invention, "inner surfaces" designates those surfaces of the outer pane and of the inner pane that are provided to be turned toward the interior. In the composite pane according to the invention, the inner surface of the outer pane and the outer surface of the inner pane are turned toward one another and bonded to one another via the thermoplastic intermediate layer.

In the context of the invention, if a layer or another element contains at least one material, this includes the case that the layer is made of the material.

In the context of the invention, a coating can comprise two or more individual layers of different materials. However, a coating can, in principle, comprise only one individual layer.

If a first layer of a coating is arranged above a second layer of the coating, this means, in the context of the invention, that the first layer is arranged farther from the surface on which the coating is applied than the second layer. If a first layer of a coating is arranged below a second layer of the coating, this means, in the context of the invention, that the second layer is arranged farther from the surface, on which the coating is applied, than the first layer. If a first layer of a coating is arranged above or below a second layer of the coating, this does not necessarily mean, in the context of the invention, that the first and the second layer are situated in direct contact with each other. One or a plurality of other layers can be arranged between the first and the second layer, so long as this is not explicitly ruled out. If a first layer is arranged between two other layers, this means, in the context of the invention, that one other layer is arranged above the first layer and the other additional layer is arranged below the first layer.

The particular advantage of the invention resides in the combination of the sun protection coating and the heat protection coating. By means of the sun protection coating, fractions of the sunlight, in particular in the infrared spectral range, are reflected. By this means, the heating of the interior delimited by the composite pane as a result of direct sunlight is reduced. In addition, the sun protection coating reduces the heating of the composite pane, in particular the heating of the elements arranged behind the sun protection coating in the direction of incidence of the sunlight such as the inner pane. Such heating results, with conventional composite panes, in emission of thermal radiation starting from the composite pane into the interior, with the thermal radiation with typically occurring pane temperatures having wavelengths above roughly 5000 nm. By means of the heat protection coating (frequently also referred to as low E coating), the emission of the long-wave thermal radiation of the composite pane into the interior is further reduced. The heat protection coating thus gives the composite pane lower interior-side emissivity. Emissivity means the measure that indicates how much thermal radiation the pane gives off compared to an ideal thermal emitter (a black body). On the other hand, the heat protection coating reduces, with low outside temperatures, the emission of heat of the interior into the external environment. Thus, compared to conventional composite panes, the composite pane according to the invention is perceived as an unpleasant heat sink by individuals in the interior to a significantly lesser extent. The inside climate of the interior is thus significantly improved both with high outside temperatures (in the summer) and with low outside temperatures (in winter).

In addition, the heat protection coating according to the invention reduces the transmission of visible light through the composite pane. The composite pane according to the invention is consequently particularly suited for applications in which no legal regulations exist for light transmission and in which a reduced light transmission can be desirable, for example, for aesthetic or thermal reasons, in motor vehicles, in particular as side windows behind the B-pillar, triangular panes, rear window, or roof panel. The use of tinted glasses or stained polymer layers can thus be avoided, which simplifies the production process of the composite pane and reduces the risk of corrosion for the functional layers that is caused in tinted panes by the addition of, for example, iron oxide. That is another major advantage of the invention.

The heat protection coating according to the invention comprises at least one functional layer that contains at least one metal from the group consisting of niobium (Nb), tantalum (Ta), molybdenum (Mo), and zirconium (Zr). The heat protection coating is arranged on the inner surface of the inner pane. This is particularly advantageous with regard to the thermal comfort in the interior, which is achieved in summer by the reduction of the emission of thermal radiation of the entire composite pane into the interior, in the winter through the reduction of the emission of heat out of the interior.

The heat protection coating preferably comprises at least two functional layers, which contain at least one metal from the group consisting of niobium, tantalum, molybdenum, and zirconium. Thus, particularly good results regarding the reduced emissivity are obtained.

The metal from the group consisting of niobium, tantalum, molybdenum, and zirconium can be completely or partially nitrided (NbN, TaN, MoN, ZrN). This is particularly advantageous with regard to the chemical stability of the functional layer.

The functional layer according to the invention of the heat protection coating absorbs and reflects parts of the visible light incident from the outside. The transmission through the composite pane according to the invention in the visible spectral range is thus reduced. The desired transmission through the composite pane can be selected by the person skilled in the art based on the layer thickness of the functional layer or the functional layers. Thus, dark panes can be realized that transmit particularly little of the incident sunlight in the visual range from the outside into the interior. The heat protection coating according to the invention can be designed such that the interior-side reflection in the spectral range is markedly reduced compared to conventional tinted panes. This is a major advantage of the invention compared to conventional tinted panes with which interior-side reflections are frequently annoyingly noticeable.

The thickness of a functional layer of the heating protection coating is preferably from 1 nm to 35 nm, particularly preferably from 3 nm to 25 nm and can, for example, be from 5 nm to 15 nm. If the heat protection coating comprises more than one functional layer, the overall thickness of all functional layers is preferably less than or equal to 50 nm. In this range for the thickness of the individual functional layers and the total thickness of all functional layers, particularly good results are achieved with regard to the reduced transmission through the composite pane in the visible spectral range and with regard to the reduced emissivity. The individual functional layers can have the same thickness or different thicknesses.

The heat protection coating preferably further comprises at least one dielectric layer. The dielectric layer contains or is made of a dielectric material and is preferably transparent. The dielectric layer is preferably arranged on the interior-side relative to any functional layer. In an advantageous embodiment of the invention, at least one functional layer is arranged between two dielectric layers. This means, in the context of the invention, that one dielectric layer is arranged above the functional layer and the other dielectric layer is arranged below the functional layer. It is particularly advantageous for each functional layer to be arranged between two dielectric layers. The functional layers and the dielectric layers are preferably arranged such that, in each case, between two adjacent functional layers, between which no further functional layer is arranged, at least one dielectric layer is arranged and that above the uppermost functional layer at least one further dielectric layer is arranged and that below the lowest functional layer at least one further dielectric layer is arranged. The functional layer does not necessarily have to be situated in direct contact with the dielectric layers. Also, one or a plurality of further layers can be arranged between the functional layer and the dielectric layer.

The dielectric layer of the heat protection coating preferably contains at least silicon nitride ($Si_3N_4$). The silicon nitride is particularly preferably doped, in particular with aluminum. This is particularly advantageous with regard to the aging resistance of the dielectric layer. In addition, a more rapid deposition of the dielectric layer is obtained, for example, by magnetic field assisted cathode sputtering. The fraction of the doping on the dielectric layer is quite particularly preferably from 5 wt.-% to 10 wt.-%. With this, particularly good results are obtained.

The dielectric layer of the heat protection coating can, however, also contain other suitable dielectric materials, for example, oxides such as $SnO_2$, $Bi_2O_3$, $TiO_2$, ZnO, $SiO_2$, and/or nitrides such as AlN. At least one of the dielectric layers can also comprise a sequence of layers with high and low indices of refraction, for example, $Si_3N_4/SiO_2$ or $Si_3N_4/SiO_2/Si_3N_4$.

The thickness of the dielectric layer of the heat protection coating is preferably from 5 nm to 120 nm, particularly preferably from 10 nm to 70 nm, quite particularly preferably from 40 nm to 60 nm. With this, particularly good results are achieved in terms of the color effect of the coating and with regard to reflections on the coating.

The heat protection coating preferably comprises at least one sacrificial layer. The sacrificial layer preferably contains at least titanium and/or nickel chromium. The sacrificial layer is preferably arranged between at least one functional layer and at least one dielectric layer angeordnet. The sacrificial layer is preferably situated in direct contact with the functional layer. Particularly preferably, each functional layer is situated in direct contact with at least one sacrificial layer. It is particularly advantageous for each functional layer to be arranged between two sacrificial layers, with the functional layer preferably situated in direct contact with the two sacrificial layers surrounding it. By means of the sacrificial layer, protection of the functional layer during heating is obtained, in particular during the production of the composite pane according to the invention. The thickness of the sacrificial layer is preferably on the order of a few nanometers and is, for example, from 1 nm to 3 nm. However, the sacrificial layer can also have a thickness of less than 1 nm.

The sun protection coating reflects fractions of the incident sunlight outside the visible spectral range, in particular in the infrared spectral range. By means of the sun protection coating, the heating up of the interior due to direct sunlight is reduced.

The sun protection coating comprises, according to the invention, at least one functional layer. The functional layer contains at least silver. The functional layer can also contain at least one silver-containing alloy.

In an advantageous embodiment of the invention, the sun protection coating comprises at least two functional layers, particularly preferably two or three functional layers. Sun protection coatings with a plurality of functional layers enable high reflectivity for infrared radiation with simultaneously high transmission in the visible spectral range. However, sun protection coatings with more than three functional layers require technically complex and cost intensive production.

The thickness of each functional layer of the sun protection coating is preferably from 5 nm to 25 nm, particularly preferably from 10 nm to 20 nm. The total layer thicknesses of all functional layers of the sun protection coating is preferably from 20 nm to 80 nm, particularly preferably from 30 nm to 60 nm. Particularly good results with regard to the sun protection function and transparency are achieved in this range for the thickness of the functional layer and the total thickness of all functional layers.

The sun protection coating preferably comprises at least one dielectric layer. Each functional layer is particularly preferably arranged between two dielectric layers. The functional layers and the dielectric layers are preferably arranged such that, in each case, between two adjacent functional layers, between which no further functional layer is arranged, at least one dielectric layer is arranged and that at least one further dielectric layer is arranged above the uppermost functional layer, and that at least one additional dielectric layer is arranged below the lowest functional layer. The dielectric layers of the sun protection coating preferably contain at least silicon nitride. The silicon nitride can have doping, in particular aluminum. The dielectric layers preferably have thicknesses from 10 nm to 100 nm, particularly preferably from 20 nm to 70 nm.

The dielectric layers of the sun protection coating can, however, also contain other suitable materials known to the person skilled in the art, for example, at least one metal oxide such as $SnO_2$, $Bi_2O_3$, $TiO_2$, $ZnO$, and/or at least one metal nitride such as $AlN$.

The sun protection coating can comprise further layers that are known to the person skilled in the art, for example, smoothing layers and/or blocker layers.

In an advantageous embodiment of the invention, the sun protection coating is applied on the inner surface of the outer pane. The sun protection coating is arranged between the outer pane and the thermoplastic intermediate layer and advantageously protected against corrosion and other damage. In an advantageous embodiment, the sun protection coating extends over the entire surface of the transparent substrate, minus a circumferential frame-shaped coating-free region with a width from 2 mm to 20 mm, preferably from 5 mm to 10 mm. The coating-free region is preferably hermetically sealed by the thermoplastic intermediate layer or an acrylic adhesive as a vapor diffusion barrier. Thus, the sun protection coating is advantageously protected against moisture and atmospheric oxygen.

In an alternative advantageous embodiment of the invention, the thermoplastic intermediate layer (3) contains a carrier film (6), which has the sun protection coating (4). The sun protection coating is applied on the carrier film, which is bonded via at least one first thermoplastic film to the outer pane and via at least one second thermoplastic film to the inner pane. The sun protection coating is embedded in the thermoplastic intermediate layer, which is formed by the carrier film and the two thermoplastic films, and is advantageously protected against damage or corrosion. The carrier film preferably contains at least one polyester and/or one polyimide, particularly preferably a thermoplastic polyester, for example, polyethylene naphthalate (PEN) or polyethylene terephthalate (PET). The carrier film preferably has a thickness from 10 µm to 500 µm, particularly preferably from 15 µm to 200 µm and quite particularly preferably from 20 µm to 100 µm, for example, 25 µm or 50 µm. This is particularly advantageous with regard to the stability and processability of the carrier film. The sun protection coating on the carrier film preferably does not extend all the way to the side edges of the composite pane, but rather is surrounded circumferentially on the sides by the thermoplastic intermediate layer. This is particularly advantageous with regard to the protection of the sun protection coating against corrosion. For this purpose, the carrier film can, for example, have a circumferential coating-free edge region. Alternatively, the carrier film can have a smaller size than the inner pane, the outer pane, and the thermoplastic films and be suitably arranged in the composite.

However, the sun protection coating can alternatively even be applied according to the invention on the outer surface of the inner pane.

The sun protection coating and/or the heat protection coating can also surround coating-free regions that serve, for example, as data transmission windows or communication windows.

The outer pane and/or the inner pane preferably contain glass, particularly preferably flat glass, float glass, quartz glass, borosilicate glass, soda lime glass, or plastics, preferably rigid plastics, in particular polyethylene, polypropylene, polycarbonate, polymethyl methacrylate, polystyrene, polyamide, polyester, polyvinyl chloride, and/or mixtures thereof. Examples of suitable glass types are known from DE 697 31 268 T2, page 8, par. [0053]. The glass can be prestressed, partially prestressed, or non-prestressed.

The outer pane and/or the inner pane has, in an advantageous embodiment, transmission in the visible spectral range greater than 70%, preferably greater than 85%. This means the transmission of the panes without sun protection coating and without heat protection coating. The outer pane and/or the inner pane are preferably colorless or have only slight tinting or staining. The heat protection coating according to the invention reduces the transmission in the visible spectral range such that even without tinted panes or stained films, a darkening of the composite pane is obtained. The particular advantage compared to the use of tinted panes or stained films resides in simpler production of the composite glass and less susceptibility of the functional layers to corrosion. Of course, alternatively, tinted or stained panes and/or stained films can be used, for example, to further reduce transmission through the composite pane or for aesthetic reasons. Tinted panes or stained films are, to be sure, more greatly heated as a result of absorbed sunlight; however, the emission of thermal radiation into the interior is effectively reduced by the heat protection coating according to the invention.

The thickness of the outer pane and the thickness of the inner pane can vary widely and thus be excellently adapted to the requirements in the individual case. Preferably, panes with the standard thicknesses of 1.0 mm to 25 mm and particularly preferably of 1.4 mm to 3.5 mm are used. The outer pane and the inner pane can have the same thickness or different thicknesses.

The size of the composite pane according to the invention can vary widely and is determined by the use according to the invention. The composite pane has, for example, areas from 200 cm$^2$ up to 4 m$^2$ customary in the automobile industry and the architecture sector.

The outer pane and the inner pane can have any three-dimensional shape. Preferably, the three-dimensional shape has no shadow zones, such that panes, for example, can be coated by cathode sputtering. The outer pane and the inner pane are preferably flat or slightly or greatly bent in one or in multiple spatial directions.

The inner pane provided with the heat protection coating and, as applicable, the outer pane provided with the sun protection coating are preferably implemented such that they can be heated, fused, tempered, convexly or concavely bent, bossed, and/or enameled. It has been demonstrated that the heat protection coating according to the invention and the sun protection coating according to the invention are suitable for this.

The thermoplastic intermediate layer preferably contains at least one thermoplastic plastic, for example, polyvinyl butyral (PVB), ethylene vinyl acetate (EVA), polyurethane (PU), polyethylene terephthalate (PET). The thermoplastic intermediate layer is preferably formed by a thermoplastic film, via which the outer pane and the inner pane are bonded to one another and which preferably has a thickness from 0.3 mm to 0.9 mm. The thermoplastic intermediate layer can also be formed by two or more such thermoplastic films. A coated carrier film can, for example, be arranged between the thermoplastic films. The thickness of the entire thermoplastic intermediate layer is preferably from 0.3 mm to 2 mm, particularly preferably from 0.3 mm to 1 mm.

An acoustics-improving, noise-suppressing film can also be used as a thermoplastic intermediate layer or as part of the thermoplastic intermediate layer. This is, in particular, advantageous when the composite pane is provided as a roof panel. In particular with rain and hail, annoying noises can enter into the interior; this is reduced by a noise-suppressing film.

The composite pane according to the invention preferably has interior-side emissivity of a maximum of 50%, particularly preferably of a maximum of 30%, and quite particularly preferably of a maximum of 25%. Here, the term "emissivity" designates the normal total emission level.

The composite pane according to the invention preferably has an exterior-side reflectivity in the spectral range of a standard illuminant D65 at an angle of incidence of 10° of more than 10%, particularly preferably more than 25%.

The composite pane according to the invention preferably has an interior-side reflectivity in the spectral range of a standard illuminant D65 at an angle of incidence of 10° of more than 5%, particularly preferably more than 8%.

The composite pane according to the invention preferably has an interior-side reflectivity in the visible spectral range of a standard light source A at an angle of incidence of 10° of less than 7%, particularly preferably less than 5%.

The composite pane according to the invention preferably has transmission to the interior in the spectral range of a standard illuminant D65 at an angle of incidence of 10° of less than 10%, particularly preferably less than 5%.

The composite pane according to the invention preferably has transmission to the interior in the visible spectral range of a standard illuminant D65 at an angle of incidence of 10° of less than 25%, particularly preferably less than 10%, quite particularly preferably less than 5%.

The composite pane according to the invention preferably has transmission to the interior in the visible spectral range of a standard light source A at an angle of incidence of 10° of more than 1%, particularly preferably more than 1.5%, quite particularly preferably more than 2%. Thus, the pane is not completely opaque such that a visual impression of objects behind the pane can be perceived.

An exterior-side reflectivity describes the reflected fraction of the incident radiation from the external environment toward which the outer pane is turned. An interior-side reflectivity describes the reflected fraction of the incident radiation from the interior toward which the inner pane is turned.

The invention further comprises a method for producing a composite pane with a sun protection and a heat protection function, wherein at least
- a sun protection coating comprising at least one functional layer, which contains at least silver, is applied on the inner surface of an outer pane or on the outer surface of an inner pane or is introduced into the thermoplastic intermediate layer,
- a heat protection coating comprising at least one functional layer, which contains at least one metal from the group consisting of niobium, tantalum, molybdenum, and zirconium, is applied on the inner surface of an inner pane, and, thereafter
- the outer pane and the inner pane are bonded via the thermoplastic intermediate layer to form the composite pane.

The outer pane and the inner pane are bonded to one another such that the inner surface of the outer pane and the outer surface of the inner pane are turned toward one another.

The application of the sun protection coating can occur before, after, or simultaneously with the application of the heat protection coating. The bonding of the outer pane and the inner pane to form composite glass takes place after both the sun protection coating and the heat protection coating have been applied.

The thermoplastic intermediate layer can be provided in the form of a thermoplastic film. However, the thermoplastic intermediate layer can also be provided in the form of a plurality of films, for example, two thermoplastic films and one carrier film. The application of the sun protection coating on the thermoplastic intermediate layer includes only application of the sun protection coating onto one of the films, for example, onto the carrier film. The carrier film is preferably arranged at the time of the bonding of the pane to the composite glass between the two thermoplastic films.

The individual layers of the sun protection coating as well as the heat protection coating are deposited using methods known per se, preferably by magnetic field assisted cathode sputtering. Cathode sputtering takes place in a protective gas atmosphere, for example, of argon, or in a reactive gas atmosphere, for example, by addition of oxygen or nitrogen. However, the individual layers can also be applied using other suitable methods known to the person skilled in the art, for example, vapor deposition or chemical vapor deposition.

The invention further comprises the use of the composite pane according to the invention with a sun protection and a heat protection function in buildings or in means of transportation for travel on land, in the air, or on water, in particular as a rear window, side window, and/or roof panel in motor vehicles.

The invention is explained in detail in the following with reference to drawings and exemplary embodiments. The drawings are schematic representations and are not true to scale. The drawings in no way restrict the invention.

They depict:

FIG. 1 a cross-section through a first embodiment of the composite pane according to the invention with a sun protection and a heat protection function, FIG. 2 a cross-section through another embodiment of the composite pane according to the invention with a sun protection and a heat protection function, FIG. 3 a cross-section through another embodiment of the composite pane according to the invention with a sun protection and a heat protection function, FIG. 4 an exemplary embodiment of the method according to the invention with reference to a flowchart, and FIG. 5 another exemplary embodiment of the method according to the invention with reference to a flowchart.

FIG. 1 depicts a cross-section through an embodiment of the composite pane according to the invention with a sun protection and a heat protection function. The composite pane comprises an outer pane 1 and an inner pane 2, which are bonded to one another via a thermoplastic intermediate layer 3. The composite pane has a size of roughly 1 m² and is provided as a roof panel of an automobile, with the outer pane 1 turned toward the external environment and the inner pane 2 turned toward the vehicle interior. The outer pane 1 has an outer surface (I) and an inner surface (II). The inner pane 2 has an outer surface (III) and an inner surface (IV).

The outer surfaces (I) and (III) are turned toward the external environment; the inner surfaces (II) and (IV) are turned toward the vehicle interior. The inner surface (II) of the outer pane 1 and the outer surface (III) of the inner pane 2 are turned toward each other. The outer pane 1 and the inner pane 2 contain soda lime glass and have in each case a thickness of 2.1 mm. The thermoplastic intermediate layer 3 contains or is made of polyvinyl butyral (PVB) and has a thickness of 0.76 mm.

A sun protection coating 4 is arranged on the inner surface (II) of the outer pane 1. The sun protection coating 4 extends over the entire inner surface (II) minus a circumferential frame-shaped coating-free region with a width of 8 mm. The coating-free region is hermetically sealed by gluing to the thermoplastic intermediate layer 3. The sun protection coating 4 is thus advantageously protected against damage and corrosion. The sun protection coating 4 comprises, for example, at least two functional layers, which contain at least silver or are made of silver and have a layer thickness between 10 nm and 20 nm, with each functional layer being arranged between two dielectric layers made of silicon nitride with a thickness from 40 nm to 70 nm.

A heat protection coating 5 is arranged on the inner surface (IV) of the inner pane 2. The heat protection coating 5 comprises a plurality of layers, which are arranged on the inner pane 2 in the order indicated:

Inner pane/$Si_3N_4$/Ti/Nb/Ti/$Si_3N_4$/Ti/Nb/Ti/$Si_3N_4$

The heat protection coating 5 comprises two functional layers, which contain at least niobium (Nb) or are made of niobium. The functional layers have, for example, in each case a thickness of roughly 10 nm. The functional layers can also have different thicknesses. For example, the functional layer nearer the inner pane 2 can have a thickness from 15 nm to 20 nm and the functional layer farther from the inner pane 2 can have a thickness from 3 nm to 7 nm. Each functional layer is arranged between two sacrificial layers, which contain at least titanium or are made of titanium. The sacrificial layers have, for example, a thickness of roughly 1 nm. The composite made up of each functional layer and the two sacrificial layers surrounding it is arranged between two dielectric layers. The dielectric layers contain at least or are made of silicon nitride ($Si_3N_4$). Each dielectric layer has, for example, a thickness from 40 nm to 55 nm.

The sun protection coating according to the invention results in a reduced heating up of the vehicle interior and of the inner pane 2 due to the reflection of infrared radiation. On the one hand, the heat protection coating 5 reduces the emission of thermal radiation through the composite pane into the vehicle interior, in particular in the case of high external temperatures. On the other hand, the heat protection coating 5 reduces the emission of thermal radiation out of the vehicle interior in the case of low external temperatures. In addition, the heat protection coating 5 reduces the transmission of visible light into the vehicle interior such that tinted glass needs to be used to a lesser extent or not at all, when such reduced transmission is desired, for example, with roof panels. These are major advantages of the composite pane according to the invention, since the climate of the vehicle interior is clearly improved and the need to use air conditioning is reduced.

Both the sun protection coating 4 and the heat protection coating 5 have high thermal resistance such that they survive even temperature treatment or bending of the panes 1, 2 at temperatures of typically more than 600° C. without damage.

FIG. 2 depicts a cross-section through another embodiment of the composite pane according to the invention with a sun protection and a heat protection function. The outer pane 1 and the inner pane 2 contain soda lime glass and have in each case a thickness of 2.1 mm. In contrast to FIG. 1, the sun protection coating 4 is arranged not on the inner surface (II) of the outer pane 1 but rather on a carrier film 6. The carrier film 6 contains or is made of polyethylene terephthalate (PET) and has a thickness of 50 μm. The sun protection layer 4 comprises a layer structure that contains at least one silver-containing functional layer. The carrier film 6 provided with the sun protection layer 4 is commercially available (Southwall Technologies, XIR 75). The carrier film 6 with the sun protection coating 4 is arranged between a first thermoplastic film 3a and a second thermoplastic film 3b. The thermoplastic films 3a and 3b as well as the carrier layer 6 form the thermoplastic intermediate layer 3. The thermoplastic film 3a and 3b contain or are made of PVB and have a layer thickness of 0.38 mm. The carrier film 6 has a somewhat smaller size than the outer pane 1, the inner pane 2, and the thermoplastic films 3a and 3b. The carrier film 6 is arranged in the composite such that the carrier film 6 does not extend all the way to the side edges of the composite glass. The carrier film 6 is thus surrounded in the edge region of the composite pane circumferentially with a width of roughly 8 mm by the thermoplastic films 3a and 3b. The sun protection coating 4 on the carrier film 6 is thus advantageously protected against damage and, in particular, corrosion. The heat protection coating 5 on the inner surface (III) of the inner pane 2 is implemented as in FIG. 1.

FIG. 3 depicts a cross-section through another embodiment of the composite pane according to the invention with a sun protection and a heat protection function. In contrast to FIG. 1, the sun protection coating 4 is arranged not on the inner surface (II) of the outer pane 1, but rather on the outer surface (III) of the inner pane 2, with a circumferential edge region of the outer surface (III) with a width of roughly 8 mm not provided with the sun protection coating 4. In this embodiment as well, the sun protection coating 4 is advantageously protected against damage and corrosion. The heat protection coating 5 on the inner surface (IV) of the inner pane 2 is implemented as in FIG. 1.

Example

Figure 1:
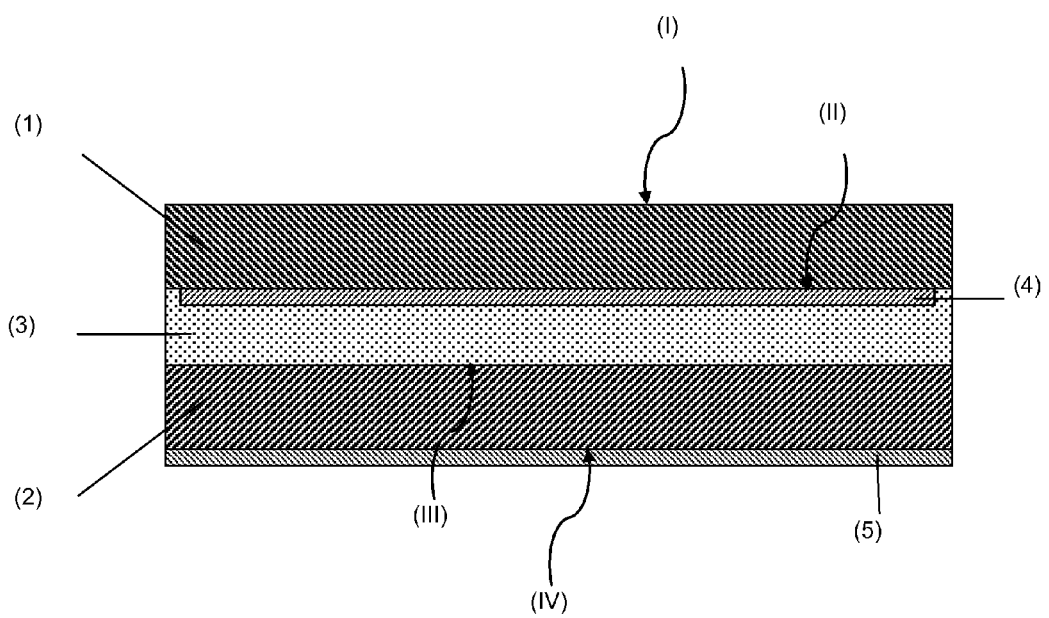
Figure 2:
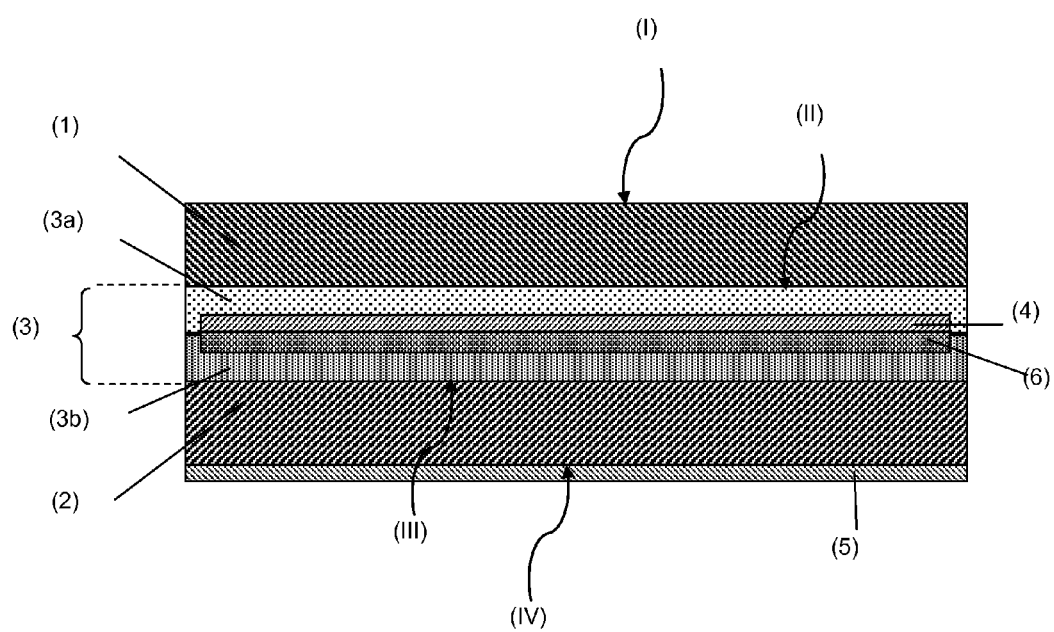
Figure 3:
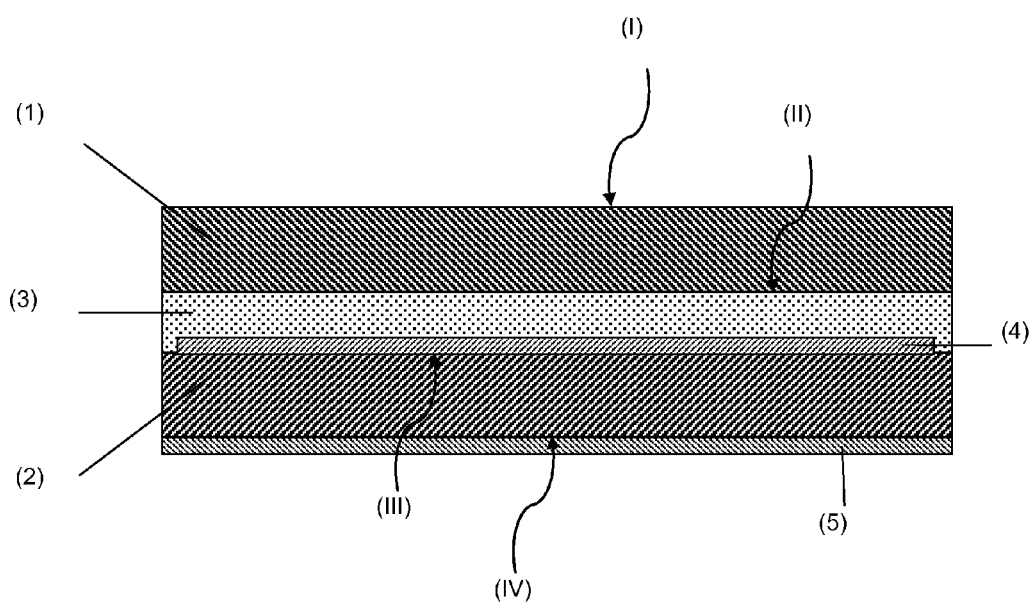
Figure 4:
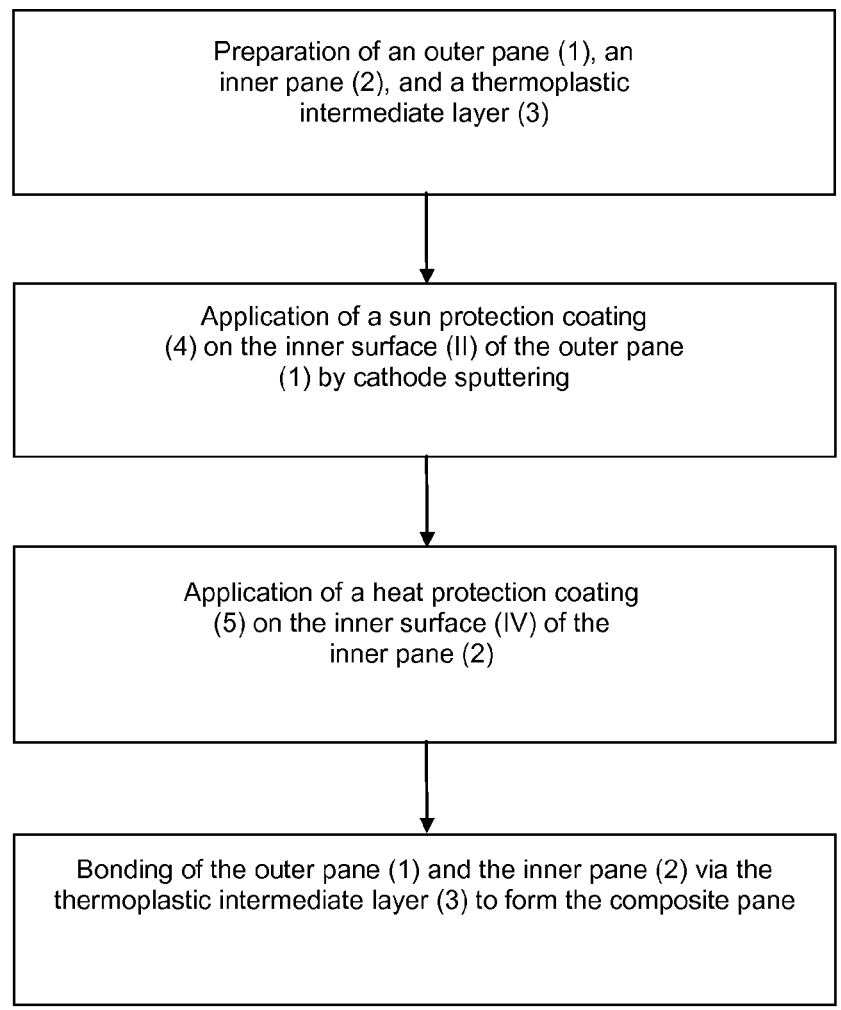
FIG. 4 depicts a flowchart of an exemplary embodiment of the method according to the invention for producing a composite pane with a sun protection and a heat protection function.
Figure 5:
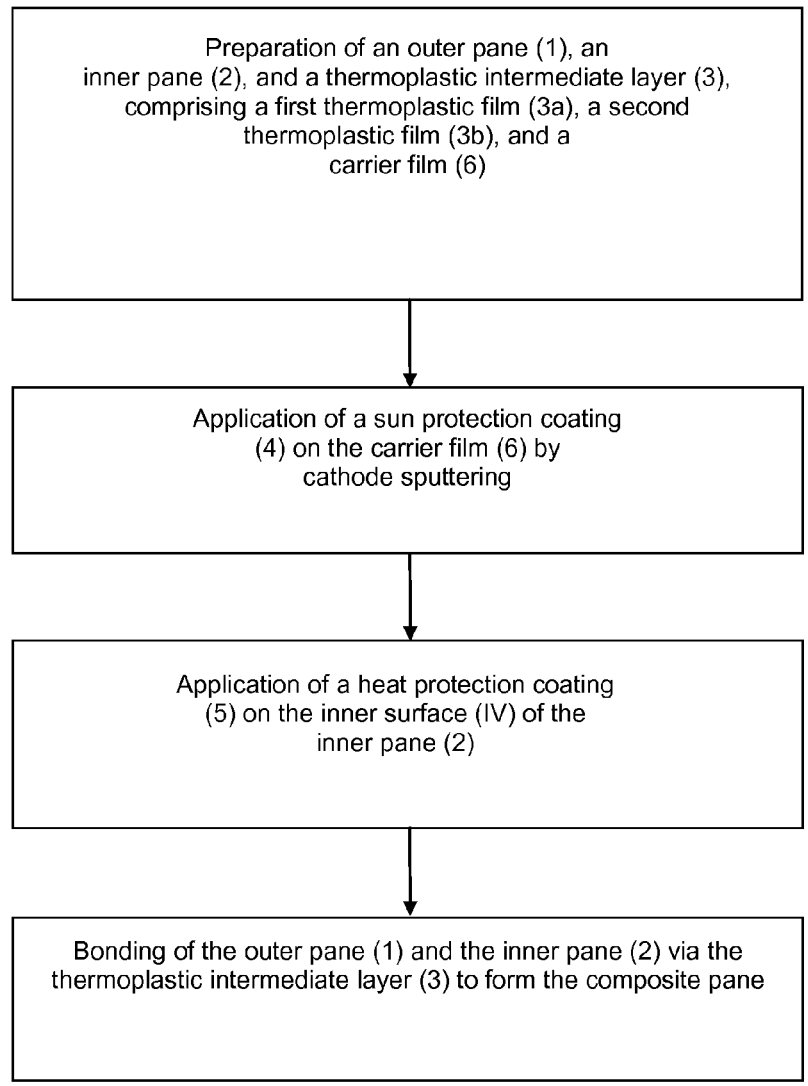
FIG. 5 depicts a flowchart of another exemplary embodiment of the method according to the invention for producing a composite pane with a sun protection and a heat protection function.

The emissivity as well as the optical properties of a test pane according to FIG. 2 are summarized in Table 1 and Table 2. The outer pane 1 and the inner pane 2 were clear or nearly clear. The values indicated in the tables were obtained through measurements in accordance with ISO Standard 9050 (AM 1.5) under standardized measurement conditions. The angle of incidence of the light on the composite pane according to the invention was 10°.

The table indicates the normal emissivity $\square_n$. The transmission $T_L(A)$ indicates the radiant energy transmitted into the vehicle interior in the light optical radiation range of a standard light source A. The transmission $T_L(D65)$ indicates the radiant energy transmitted into the vehicle interior in the light optical radiation range of a standard illuminant D65. The transmission $T_E$ indicates the radiant energy transmitted into the vehicle interior of the complete spectrum of the illuminant D65. Also characterized are the interior-side reflection (light reflected into the vehicle interior) and the exterior-side reflection (light reflected to the external environment). $R_L(A)$ indicates the reflected radiant energy in the light optical radiation range of light A and $R_E$ indicates the reflected radiant energy of the complete spectrum of the illuminant D65. The data a* and b* refer to the color coordination in accordance with the colorimetric model (L*a*b* color space, illuminant D65).

Comparative Example

For the comparison, a conventional, widely distributed tinted composite pane for roof panels without sun protection coating 4 and without heat protection coating 5 was characterized. The corresponding measured values are indicated in Table 1 and Table 2.

TABLE 1

|  |  | Transmission | | | | |
| --- | --- | --- | --- | --- | --- | --- |
|  | $\square_n$ | $T_L(A)$ | $T_L(D65)$ | $T_E$ | a* | b* |
| Comparative Example | 0.84 | 21% | 22% | 12% | −7.7 | 2.0 |
| Example | 0.20 | 4% | 4% | 3% | 0.9 | 2.6 |

TABLE 2

|  | Interior-side reflection | | | | Exterior-side reflection | | | |
| --- | --- | --- | --- | --- | --- | --- | --- | --- |
|  | $R_L(A)$ | $R_E$ | a* | b* | $R_L(A)$ | $R_E$ | a* | b* |
| Comparative Example | 5% | 4% | −0.4 | 0.1 | 5% | 4% | −0.4 | 0.1 |
| Example | 3% | 12% | −5.1 | −22.1 | 20% | 31% | −2.2 | 4.5 |

The composite pane according to the invention with the sun protection coating 4 and that heat protection coating 5 has, compared to the conventional composite pane, clearly reduced transmission. This is accomplished, on the one hand, by the heat protection coating 5 according to the invention ($T_L(A)$, $T_L(D65)$, and $T_E$), on the other, by the sun protection coating 4 according to the invention largely transparent in the visible spectral range ($T_E$). The interior-side reflection in the light optical range $R_L(A)$ is reduced with the composite pane according to the invention compared to the comparative pane, which results in a more pleasant optical impression for the vehicle occupants. The interior-side reflection in the entire radiation range of the illuminant D65 is, however, clearly increased with the composite pane according to the invention, which points to an increased reflected fraction of radiation outside the visible range, in particular in the infrared range. The composite pane according to the invention thus has particularly good reflectivity for thermal radiation out of the vehicle interior. The normal emissivity $\square_n$ is very low at 0.20. The composite pane according to the invention thus gives off only relatively little thermal radiation into the vehicle interior. The exterior-side reflections $R_L(A)$ and $R_E$ are clearly increased with the composite pane according to the invention. The increase is clearly more pronounced with the reflection $R_E$ in the entire radiation range than with the reflection $R_L(A)$ in the visible range, which must be attributed to the reflection of infrared radiation by the sun protection layer 4.

A part of the incident sunlight in the infrared spectral range is reflected by the sun protection coating 4 according to the invention. This results in less heating of the vehicle interior as well as of the components of the composite pane arranged behind the sun protection coating 4 in the direction of propagation of the incident radiation, in particular of the inner pane 2. The reduced heating of the inner pane 2 results in reduced thermal radiation from the inner pane 2 into the vehicle interior. In addition, the thermal radiation of the inner pane 2 into the vehicle interior through the heat protection coating 5 according to the invention is further reduced. Moreover, with low outside temperatures, the heat protection coating 5 reduces the emission of (infrared) thermal radiation out of the interior. In addition, the heat protection coating 5 according to the invention results in a reduced transmission of visible light in the vehicle interior such that, in comparison with the prior art, it is possible to use no tinted panes or polymer layers or at least less strongly tinted panes or polymer layers.

The combination of the sun protection coating 4 according to the invention with the heat protection coating 5 according to the invention thus results in a significant improvement of the climate in the vehicle interior both in summer and in winter. This result was unexpected and surprising for the person skilled in the art.

LIST OF REFERENCE CHARACTERS (1) outer pane
(2) inner pane (3) thermoplastic intermediate layer
(3a) first thermoplastic film
(3b) second thermoplastic film
(4) sun protection coating
(5) heat protection coating
(6) carrier film
(I) outer surface of (1)
(II) inner surface of (1)
(III) outer surface of (2)
(IV) inner surface of (2)

The invention claimed is:

1. A composite pane with a sun protection and a heat protection function, comprising:
    an outer pane with an outer surface and an inner surface;
    an inner pane with an outer surface and an inner surface;
    a thermoplastic intermediate layer including a sun protection coating on a carrier film; and
    a heat protection coating on the inner surface of the inner pane,
        wherein the sun protection coating comprises at least one functional layer, which contains at least silver,
        wherein the heat protection coating comprises at least one functional layer, which contains at least one metal from the group consisting of niobium, tantalum, molybdenum, and zirconium,
        wherein the sun protection coating on the carrier film is surrounded circumferentially on sides of the sun protection coating by the thermoplastic intermediate layer,
        wherein the outer pane, the inner pane, and the thermoplastic intermediate layer are not tinted,
        wherein the outer pane and the inner pane have a transmission in the visible spectral range greater than 70%, and
        wherein the heat protection coating is configured so that the composite pane has a transmission in the visible spectral range of less than 10%.

2. The composite pane according to claim 1, wherein the heat protection coating comprises at least two functional layers, which contain at least one metal from the group consisting of niobium, tantalum, molybdenum, and zirconium.

3. The composite pane according to claim 1, wherein each functional layer of the heat protection coating has a thickness of 1 nm to 35 nm, and wherein the total thickness of all functional layers is less than or equal to 50 nm.

4. The composite pane according to claim 3, wherein each functional layer of the heat protection coating has a thickness of 3 nm to 25 nm.

5. The composite pane according to claim 1, wherein at least one functional layer of the heat protection coating is arranged between two transparent, dielectric layers.

6. The composite pane according to claim 5, wherein each functional layer of the heat protection coating is arranged between two transparent dielectric layers.

7. The composite pane according to claim 6, wherein the two transparent dielectric layers include at least silicon nitride.

8. The composite pane according to claim 6, wherein each of the two transparent dielectric layers has a thickness of 5 nm to 120 nm.

9. The composite pane according to claim 6, wherein each of the two transparent dielectric layers has a thickness of 10 nm to 70 nm.

10. The composite pane according to claim 6, wherein each of the two transparent dielectric layers has a thickness of 40 nm to 60 nm.

11. The composite pane according to claim 1, wherein the heat protection coating comprises at least one sacrificial layer between at least one functional layer and at least one dielectric layer.

12. The composite pane according to claim 11, wherein the sacrificial layer contains at least either one or both of titanium and nickel chromium.

13. The composite pane according to claim 1, wherein the sun protection coating comprises at least two functional layers, which contain at least silver.

14. The composite pane according to claim 13, wherein the sun protection coating comprises two or three functional layers.

15. The composite pane according to claim 13, wherein each functional layer is arranged between two transparent, dielectric layers.

16. The composite pane according to claim 15, wherein the two transparent, dielectric layers contain at least silicon nitride.

17. The composite pane according to claim 1, which has an interior-side emissivity of at most 50%.

18. The composite pane according to claim 17, which has an interior-side emissivity of at most 30%.

19. The composite pane according to claim 1, which has an outside reflectivity in the spectral range of a standard illuminant D65 of more than 10%.

20. The composite pane according to claim 19, which has an outside reflectivity in the spectral range of a standard illuminant D65 of more than 25%.

21. The composite pane according to claim 1, which has an interior-side reflectivity in the spectral range of a standard illuminant D65 of more than 5%.

22. The composite pane according to claim 21, which has an interior-side reflectivity in the spectral range of a standard illuminant D65 of more than 8%.

23. The composite pane according to claim 1, wherein the carrier film has a circumferential coating-free edge region that is devoid of the sun protection coating.

24. The composite pane according to claim 1, wherein the carrier film has a smaller size than the outer pane, the inner pane, and the thermoplastic layer, so that the sun protection coating and the carrier film are surrounded circumferentially on sides of the sun protection coating and the carrier film by the thermoplastic intermediate layer.

25. The composite pane according to claim 1, wherein a thickness of each functional layer of the heat protection coating changes according to a position of the each functional layer with respect to the inner surface of the inner pane.

26. The composite pane according to claim 25, wherein the thickness for a position closer to the inner surface is greater than the thickness for a position farther from the inner surface.

27. A method for producing a composite pane, comprising:
    applying a sun protection coating comprising at least one functional layer, which contains at least silver, on a carrier film;
    introducing the sun protection coating on the carrier film into a thermoplastic intermediate layer, thereby circumferentially surrounding on sides of the sun protection coating, the sun protection coating on the carrier film with the thermoplastic intermediate layer;
    applying a heat protection coating comprising at least one functional layer, which contains at least one metal from the group consisting of niobium, tantalum, molybdenum, and zirconium, on the inner surface; and thereafter bonding an outer pane with an outer surface and an inner surface and an inner pane with an outer surface and an inner surface via the thermoplastic intermediate layer to form the composite pane,
- wherein the heat protection coating is on the inner surface of the inner pane,
- wherein the outer pane, the inner pane, and the thermoplastic intermediate layer are not tinted,
- wherein the outer pane and the inner pane have a transmission in the visible spectral range greater than 70%, and
- wherein the heat protection coating is configured so that the composite pane has a transmission in the visible spectral range of less than 10%.

28. A method, comprising:

using a composite pane with a sun protection and a heat protection function in buildings or in means of transportation for travel on land, in the air, or on water, wherein the composite pane includes
- an outer pane with an outer surface and an inner surface,
- an inner pane with an outer surface and an inner surface,
- a thermoplastic intermediate layer comprising a sun protection coating on a carrier film,
- a sun protection coating at least on the inner surface of the outer pane, on the outer surface of the inner pane, or in the thermoplastic intermediate layer, and
- a heat protection coating on the inner surface, wherein the sun protection coating comprises at least one functional layer, which contains at least silver, wherein the heat protection coating comprises at least one functional layer, which contains at least one metal from the group consisting of niobium, tantalum, molybdenum, and zirconium, wherein the sun protection coating on the carrier film is surrounded circumferentially on sides of the sun protection coating by the thermoplastic intermediate layer, wherein the outer pane, the inner pane, and the thermoplastic intermediate layer are not tinted, wherein the outer pane and the inner pane have a transmission in the visible spectral range greater than 70%, and wherein the heat protection coating is configured so that the composite pane has a transmission in the visible spectral range of less than 10%.

29. The method of claim 28, further comprising:

using a composite pane with a sun protection and a heat protection function as a rear window, side window, or roof panel of motor vehicles.

* * * * *